3,790,661
PROCESS FOR THE CONTINUOUS DEARSENIFICATION OF POLYPHOSPHORIC ACID
Horst Dieter Wasel-Nielen, Erftstadt-Lechenich, and Gero Heymer, Erftstadt-Liblar, Germany, assignors to Knapsack Aktiengesellschaft, Knapsack, near Cologne, Germany
Filed Mar. 1, 1972, Ser. No. 230,930
Claims priority, application Germany, Mar. 3, 1971, P 21 09 970.7
Int. Cl. C01b 25/16
U.S. Cl. 423—321                8 Claims

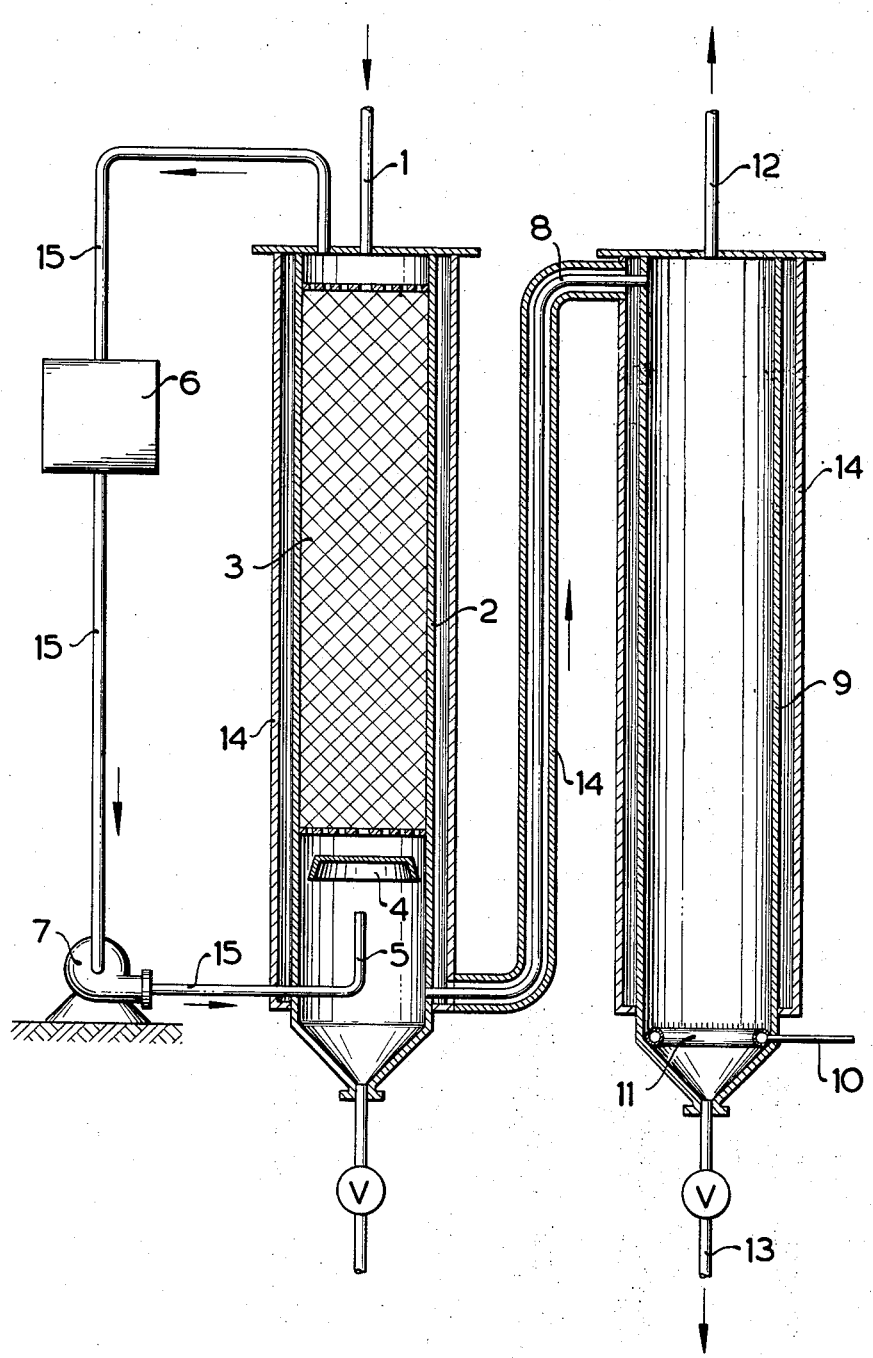

ABSTRACT OF THE DISCLOSURE

Polyphosphoric acid is dearsenicated continuously. To this end, polyphosphoric acid contaminated with arsenic is continuously introduced overhead into a packed gasification zone and hydrogen sulfide, travelling countercurrently with respect to the said polyphosphoric acid, is introduced thereinto from below and circulated therein. The polyphosphoric acid is allowed to remain in the gasification zone for a mean period between 1 and 5 hours so as to effect complete transformation of the arsenic into arsenic sulfide. Following this, the polyphosphoric acid is delivered to a degasification zone communicating with the gasification zone and compressed air is injected into the degasification zone so as to expel hydrogen sulfide in excess from the polyphosphoric acid, the gasification and desgasification zones being maintained at temperatures between 80 and 140° C. The polyphosphoric acid so treated is taken from the degasification zone and filtered in conventional manner.

---

The present invention relates to a process for the continuous dearsenication of polyphosphoric acid, and to an apparatus for carrying out this process.

Polyphosphoric acid is known to be a mixture of condensed, chain-structured phosphoric acids of the general formula $H_{n+2}P_nO_{3n+1}$. The mixing ratio in which the acids of inconsistent chain length are used depends solely on the $P_2O_5$-content of the polyphosphoric acid. The method used for making the polyphosphoric acid and the thermal treatment thereof have no influence upon this.

Polyphosphoric acid can be made by burning yellow phosphorus to produce $P_2O_5$ and by absorbing the $P_2O_5$ in orthophosphoric acid. Polyphosphoric acid finds use in the treatment of metal surfaces. It is also used as a dehydration agent in condensation and cyclization reactions, and as an acid catalyst. Conventional polyphosphoric acids are known to contain between 15 and 20 p.p.m. of arsenic (p.p.m. stand for parts per million), and this handicaps their use, especially in this latter field of application.

The dearsenication of alkali metal polyphosphate solutions by means of an alkali metal sulfide or hydrogen sulfide has already been described in Austrian Pat. No. 285,528. To achieve the separation of arsenic in sulfide form, it is necessary quantitatively to hydrolyze the As—O—P linkages and, prior to the addition of the sulfide, to acidify the alkali metal polyphosphate solutions and thereafter to allow the acidified solutions to stand for a mean period between 60 and 90 minutes, at about 80° C.

This process is not fully satisfactory, however, as it is carried out batchwise and as it merely permits about 60 percent of the arsenic contained in the alkali metal polyphosphates to be removed therefrom. In other words, a high concentration of arsenic is retained therein.

It is an object of the present invention to provide a fully satisfactory process for the continuous dearsenication of polyphosphoric acid with the resultant formation of polyphosphoric acid which is practically free from arsenic.

The process of the present invention comprises more particularly introducing polyphosphoric acid contaminated with arsenic continuously and overhead into a packed gasification zone; introducing into said zone from below hydrogen sulfide travelling countercurrently with respect to the said polyphosphoric acid, and circulating the said hydrogen sulfide in the said zone; allowing the polyphosphoric acid to remain in the gasification zone for a mean period between 1 and 5 hours so as to effect complete transformation of the arsenic contained in the polyphosphoric acid into arsenic sulfide; delivering the polyphosphoric acid to a degasifiaction zone communicating with the gasification zone; injecting compressed air into the said degasification zone so as to expel hydrogen sulfide in excess from the polyphosphoric acid, the gasification and degasification zones being maintained at temperatures between 80 and 140°; continuously removing the polyphosphoric acid from the degasification zone and filtering the acid in conventional manner.

Further preferred features of the present invention, which may be used singly or in combination, comprise:

(a) maintaining the gasification and degasification zones at temperatures between 100 and 110° C.;
(b) adding between 0.1 and 2 percent of kieslguhr and/or between 0.1 and 1 percent of active carbon to the polyphosphoric acid, prior to introducing it into the gasification zone;
(c) adding between 0.1 and 2 percent of kieselguhr and/ or between 0.1 and 1 percent of active carbon to the polyphosphoric acid, just prior to subjecting the acid to filtration.

The apparatus for carrying out the process of the present invention comprises a packed gasification tower having a bell-shaped calming member therein, the packing material, especially Raschig rings, being placed above the said calming member in the said tower; a pipe projecting into said tower from above and feeding polyphosphoric acid thereinto; a gas inlet pipe projecting into the lower portion of said tower downstream of the said calming member and feeding hydrogen sulfide thereinto; a hydrogen sulfide reservoir, a pump placed downstream thereof and a cycle line, the cycle line connecting said reservoir and said pump together, connecting the reservoir to the head of the gasification tower, and connecting the pump to the gas inlet pipe projecting into the lower portion of the tower; a degasification tower fitted with a gas outlet pipe for the removal of hydrogen sulfide-containing air therefrom, with an outlet pipe for the removal of polyphosphoric acid therefrom, and with a plurality of nozzles arranged in annular fashion in the lower portion of the said degasification tower and feeding compressed air thereinto; and a junction line running from the lower portion of degasification tower and connecting the two towers together.

Further features of the apparatus of the present invention, which may be used singly or in combination, provide:

(a) for the gasification tower, the junction line and the degasification tower to be surrounded by heating jackets;
(b) for the use of steam jackets as the heating jackets.

The substitution in the process of the present invention of a gaseous for an aqueous sulfide-containing precipitating agent has been found very advantageous in view of the fact that the chain length of polyphosphoric acid is a function of the $P_2O_5$-concentration therein.

The process of the present invention unexpectedly yields polyphosphoric acids containing less than 1 p.p.m. of arsenic, despite the fact that in the case of condensed phosphoric acids the arsenic is probably incorporated into the chains with the resultant formation of —P—O—As linkages. The polyphosphoric acid should preferably be allowed to remain in the gasification zone for a period between 3 and 4 hours.

By the step of cycling the hydrogen sulfide, it is possible to minimize the consumption thereof. It is necessary, however, always to provide for the presence of a $H_2S$-atmosphere in the gasification tower and for a satisfactory contact between the hydrogen sulfide and the polyphosphoric acid. To this end, it is necessary to use a packed gasification tower, because of the strong viscosity of polyphosphoric acid.

A filter aid, preferably about 0.5 percent of kieselguhr or 0.3 percent of active carbon, should conveniently be added to the polyphosphoric acid, prior to dearsenication or just prior to filtration.

The filtration can be effected with the use of a standard filtration apparatus, for example a drum filter or pressure filter.

An apparatus for carrying out the process of the present invention is shown diagrammatically by way of example only in the accompanying drawing.

With reference to the drawing:

Polyphosphoric acid containing arsenic is introduced into a gasification tower 2 through a feed pipe 1. The gasification tower 2 is filled in the hatched part with packing material 3 placed above a bell-shaped calming member 4, which prevents turbulence, that is produced upon the injection of hydrogen sulfide through a gas inlet 5, from affecting the polyphosphoric acid. The gas inlet 5, a pump 7, a hydrogen sulfide reservoir 6 and the upper end of gasification tower 2 are connected together by means of a conduit 15, in which hydrogen sulfide is circulated. Hydrogen sulfide coming from reservoir 6 is introduced into the tower 2, through pump 7 and gas inlet 5. A quantity of dearsenicated polyphosphoric acid, corresponding to the quantity of arsenic-containing polyphosphoric acid supplied through feed pipe 1, is forced to flow through a junction line 8 to a degasification tower 9. Degasification tower 9 is provided in its bottom portion with a plurality of nozzles, which are arranged in annular fashion and used for the injection of compressed air through line 10. Dearsenicated polyphosphoric acid is removed through an outlet pipe 13 and subjected to filtration, and air containing hydrogen sulfide escapes through offgas pipe 12. The air is initially introduced into tower 9 through nozzles 11.

The gasification tower 2, junction line 8 and degasification tower 9 are all provided with a steam jacket heater 14.

EXAMPLE 1

(Prior art process and apparatus)

Polyphosphoric acid, which contained 85.7 percent of $P_2O_5$ and 16 p.p.m. of arsenic and was mixed with 0.5 percent of kieselguhr and 0.3 percent of active carbon, was introduced into a precipitation tower and concentrated aqueous sodium sulfide solution was forced thereinto at a rate of 0.65 liter of $H_2S$ per hour per kg. of polyphosphoric acid. The polyphosphoric acid was used at a temperature of 100° C. After 3.5 hours, hydrogen sulfide in excess was expelled by means of compressed air (40 liters per hour per kg. of polyphosphoric acid) and the polyphosphoric acid was freed from arsenic sulfide by filtration. The polyphosphoric acid so treated was found to have a $P_2O_5$-concentration reduced down to 83.5 percent, but an unaltered concentration of 16 p.p.m. of arsenic.

EXAMPLE 2

(Process and apparatus of invention)

Polyphosphoric acid, which contained 85.7 percent of $P_2O_5$ and 16 p.p.m. of arsenic and was mixed with 0.5 percent of kieselguhr and 0.3 percent of active carbon, was introduced into gasification tower 2, through feed pipe 1 and allowed to remain therein for a mean period of 4 hours. The polyphosphoric acid was heated to 100° C. by means of jacket heater 14 and hydrogen sulfide was continuously injected through gas linet 5. The polyphosphoric acid delivered to degasification tower 9 was freed therein from dissolved hydrogen sulfide by means of compressed air (40 liters per hour per kg. of polyphosphoric acid). The filtered polyphosphoric acid was found to have the initial concentration of $P_2O_5$ and to contain less than 1 p.p.m. of arsenic.

In a comparative test made under identical conditions save that the bell-shaped member was omitted in gasification tower 2, the resulting polyphosphoric acid contained 7 p.p.m. of arsenic, and in a further comparative test made under identical conditions save that Raschig rings were not used in gasification tower 2, the resulting polyphosphoric acid contained 2 p.p.m. of arsenic.

We claim:

1. A process for the continuous dearsenification of polyphosphoric acid by means of hydrogen sulfide, which comprises introducing polyphosphoric acid contaminated with arsenic continuously and overhead into a packed gasification zone maintained at temperatures between 80 and 140° C.; introducing into the packed gasification zone from below hydrogen sulfide travelling countercurrently with respect to the polyphosphoric acid, and circulating the hydrogen sulfide in the packed gasification zone; allowing the polyphosphoric acid to remain in the packed gasification zone for a mean period between 1 and 5 hours so as to effect complete transformation of the arsenic contained in the polyphosphoric acid into arsenic sulfide; delivering the polyphosphoric to a degasification zone communicating with the gasification zone and equally maintained at temperatures between 80 and 140° C.; and injecting compressed air into the degasification zone so as to expel hydrogen sulfide excess from the polyphosphoric acid; continuously removing the polyphosphoric acid from the degasification zone and filtering the acid.

2. The process as claimed in claim 1, wherein between 0.1 and 2 percent of kieselguhr is added to the polyphosphoric acid, prior to introducing the acid into the packed gasification zone.

3. The process as claimed in claim 1, wherein between 0.1 and 1 percent of active carbon is added to the polyphosphoric acid, prior to introducing the acid into the packed gasification zone.

4. The process as claimed in claim 1, wherein between 0.1 and 2 percent of kieselguhr and between 0.1 and 1 percent of active carbon are added to the polyphosphoric acid, prior to introducing the acid into the packed gasification zone.

5. The process as claimed in claim 1, wherein between 0.1 and 2 percent of kieselguhr is added to the polyphosphoric acid, just prior to filtration.

6. The process as claimed in claim 1, wherein between 0.1 and 1 percent of active carbon is added to the polyphosphoric acid, just prior to filtration.

7. The process as claimed in claim 1, wherein between 0.1 and 2 percent of kieselguhr and between 0.1 and 1 percent of active carbon are added to the polyphosphoric acid, just prior to filtration.

8. The process as claimed in claim 1, wherein the gasification and degasification zones are maintained at temperatures between 100 and 110° C.

References Cited

UNITED STATES PATENTS

| | | | |
|---|---|---|---|
| 1,538,089 | 5/1925 | Carothors et al. | 423—321 |
| 1,597,984 | 9/1926 | La Bour | 423—321 |
| 1,787,192 | 12/1930 | Fiske | 423—321 |
| 3,186,793 | 6/1965 | Gills et al. | 423—321 |
| 1,858,203 | 5/1932 | Fiske et al. | 423—321 |
| 3,193,351 | 7/1965 | Miller et al. | 423—321 |

EDWARD J. MEROS, Primary Examiner

G. A. HELLER, Assistant Examiner